United States Patent
Phang et al.

(10) Patent No.: US 10,179,869 B2
(45) Date of Patent: Jan. 15, 2019

(54) PLASTIC WATER REPELLENT FORMULATION

(71) Applicant: Illinois Tool Works, Inc., Glenview, IL (US)

(72) Inventors: Tze Lee Phang, Katy, TX (US); Egest Bajrami, Saddle Brook, NJ (US)

(73) Assignee: Illinois Tool Works, Inc., Glenview, IL (US)

( * ) Notice: Subject to any disclaimer, the term of this patent is extended or adjusted under 35 U.S.C. 154(b) by 253 days.

(21) Appl. No.: 14/882,150

(22) Filed: Oct. 13, 2015

(65) Prior Publication Data

US 2017/0101551 A1  Apr. 13, 2017

(51) Int. Cl.
  *C09D 191/06* (2006.01)
  *C09D 5/00* (2006.01)
  *C09D 7/20* (2018.01)

(52) U.S. Cl.
  CPC ............ *C09D 191/06* (2013.01); *C09D 5/00* (2013.01); *C09D 7/20* (2018.01)

(58) Field of Classification Search
  None
  See application file for complete search history.

(56) References Cited

U.S. PATENT DOCUMENTS

| | | | |
|---|---|---|---|
| 2,244,685 A | 6/1941 | Fritz et al. | |
| 2,684,948 A | 7/1954 | Cross et al. | |
| 3,063,852 A | 11/1962 | Daudin et al. | |
| 3,354,180 A * | 11/1967 | Ekiss | B28B 7/384 106/12 |
| 4,681,910 A | 7/1987 | Crockatt et al. | |
| 7,332,450 B2 * | 2/2008 | Boylan | C08L 31/02 442/100 |
| 2003/0075077 A1 * | 4/2003 | Lewis | C08L 91/06 106/271 |
| 2016/0222251 A1 * | 8/2016 | Agrawal | C08J 7/047 |

FOREIGN PATENT DOCUMENTS

EP  1365060 A2  11/2003
WO  2007070714 A2  6/2007

OTHER PUBLICATIONS

International Search Report dated Dec. 21, 2016 for International Application No. PCT/US2016/056034 filed Oct. 7, 2016.

* cited by examiner

*Primary Examiner* — Melvin C. Mayes
*Assistant Examiner* — Colette B. Nguyen
(74) *Attorney, Agent, or Firm* — Avery N. Goldstein; Blue Filament Law PLLC

(57) ABSTRACT

A formulation is provided that includes a waterborne cationic wax emulsion in water, and a water miscible carrier solvent to produce a clear and transparent solution that dries to form a water repellent film on a plastic substrate when dried or excess removed. A process of applying the same is also provided.

12 Claims, No Drawings

PLASTIC WATER REPELLENT FORMULATION

FIELD OF THE INVENTION

The present invention in general relates to water repellent films and coatings, and more specifically to a formulation that renders a plastic surface hydrophobic and a process for the use thereof.

BACKGROUND OF THE INVENTION

Water on of a transparent viewing article can impair vision. Articles such as plastic visors, goggles, shields or windows routinely suffer water condensation on their surfaces. As such articles are used when a user is traveling; impaired vision becomes a safety concern. This is further complicated when the article is used at night, when water on the article surface diffracts light. Also, water on an article surface attracts grime that builds up as the water evaporates; and during cleaning, the grime is abrasive, leading to a reduced operational life for the plastic.

Traditionally, consumers use products formulated to render glass surfaces water repellent to treat plastic surfaces. Unfortunately, due to the differences in surface energy and chemistry between glass and plastics, glass surface water repellent products do not provide the desired water repellent effects on plastic surfaces and can over render the plastic hydrophilic.

Thus, there exists a need for a water repellent formulation effective to treat various plastic surfaces. There also exists a need for a process for field application of such a formulation using a conventional trigger spray application, propellant aerosol, or a sponge or cloth for wipe application.

SUMMARY OF THE INVENTION

A composition is provided that includes a cationic wax emulsion in water, and a water miscible carrier solvent to produce a clear and transparent solution that dries to form a water repellent film on a plastic substrate when the solution is dried. A process of applying the same is also provided.

DETAILED DESCRIPTION OF THE PREFERRED EMBODIMENTS

The present invention has utility as a water repellent formulation for application on plastic substrate surfaces, where the water repellent forms a film on the surface of the plastic substrate to render the underlying substrate hydrophobic. The inventive water repellent formulation produces pronounced and long lasting water beading properties on a variety of plastics. The inventive formulation is amenable to application to a variety of substrates under field conditions, yet is still able to impart the desired hydrophobicity to the treated substrates.

The inventive water repellent formulation may be applied to both old and new plastic substrates. Non-limiting illustrative examples of plastic material substrates that may be treated with the inventive water repellent formulation include various plastics including acrylics, acrylates, poly (methyl methacrylates), polypropylene-homopolymer, polypropylene-random, polystyrene, polyethylene phthalate, polysulfone, poly lactic acid, polyethlenimine, acrylonitrile-butadiene-styrene, styrene-acronitrile, methyl methacrylate-butadiene- styrene, thermoplastic polyurethane, styrene-ethylene-butylene-styrene, thermoplastic polyolefin, low density polyethylene polycarbonate, or combinations thereof. Non-limiting illustrative examples where an inventive water repellent formulation may be applied include products such as motorcycle windscreens, goggles, visors, helmets, hockey rink boards, and boat windshields. An inventive formulation is well suited for application to a transparent plastic substrate. The present invention has the attribute of being amenable to application as a wipe-on or spray applied formulation that forms a film without resort to the complex deposition processes that characterized prior art systems. In addition to being compatible with a variety of plastics, an inventive formulation also protects the plastic from environmental weathering. As a result of the durability of the hydrophobic film imparted to a plastic based substrate by the inventive composition, the plastic substrate tends to: bead water and promote water roll off from the surface; retain less water on the surface that attracts dirt, and as a result, the plastic needs to be cleaned less often.

While the present invention is further detailed with respect to application to a plastic substrate, it is appreciated that an inventive composition is readily applied to numerous other substrates to impart hydrophobic films thereto. Examples of non-plastic substrates to which an inventive formulation are readily applied include metals, wood, painted surfaces, and glass. To the extent that an inventive composition is described herein with respect to total weight percentage of various components, these amounts are provided independent of propellants that are used in pressurized aerosol packages containing the formulation.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive formulation includes a waterborne wax emulsion system in a carrier. The carrier is a majority by weight water with a minor quantity of organic solvent. The inventive formulation forms a clear solution or suspension. When applied to plastic surface, the formulation dries to produce a clear and transparent hydrophobic films. In some embodiments of the present invention, a propellant is present to afford a pressurized aerosol container for dispensing an inventive formulation onto a target substrate.

An inventive formulation is based on a cationic wax emulsion, where the emulsion is composed of a finely divided particulate wax and a surfactant dispersed in water. A wax operative herein is a paraffin wax, or a wax based on a natural source such as castor oil, palm or soybeans with triglycerides or olefins making up the majority weight of the wax. The wax used in an inventive cationic wax emulsion has a melting point between 110° F. and 140° F. In still other embodiments, the wax has a melting temperature of between 125° F. and 130° F. which helps with emulsion stability in comparison to refined paraffin wax emulsions. The wax solids content of the emulsions can be as high as 45% solids, based on the total weight of the emulsion. Wax emulsions usually include between about 15% to 40% (by weight) wax, and with from about 5% to 25% surfactant added based on the weight of the wax. Wax based emulsions are formulated according to the present invention with a cationic charge, and promote water repellency on a plastic substrate. The weight percentage of a cationic wax emulsion as detailed herein is intended to include the water and surfactants as a package.

Waxes that are to be emulsified often include moieties such as carboxylate or ester groups attached to the wax polymer. In the process of emulsification these moieties are acid modified to promote micelle formation around the wax by a surfactant. For the preparation of these emulsion types, organic acids, such as glacial acetic acid, or mineral acids such as hydrochloric acid, sulfuric acid or similar acids, are utilized for functional group modification. The quantity of functional groups that need to be modified in order to form a stable emulsion can vary depending on characteristics of the wax such as its molecular weight and amount of chain branching. This value, and the acid number, described below, provide an indication of the free carboxylic acid and ester content of the wax. The ASTM D1386 represents a method to determine the acid number; the quantity, in milligrams, of KOH necessary to neutralize one gram of wax, indicating the amount of free carboxylic acid present. According to the present invention, the wax emulsion has an oil content of less than 5% of the total weight of the total formulation to which the wax emulsion is added, and in other embodiments, the oil content is between 1 and 3% of the total formulation. A wax emulsion is typically preformulated and added to the other formulation components.

The wax compositions in an inventive wax emulsion have an iodine value (between 2.0-5.0), and melting points between 110° F. and 140° F. (as determined for example by Mettler Drop Point). Cationic surfactants operative herein illustratively include imidazolines, diethyl amine, or ethoxylated amines, such as tallow amine. It is appreciated that surfactants with HLB values of between 9.0-11.0 are operative herein; while in other embodiments the cationic surfactant has an HLB value of between 4.0 and 12.0.

A carrier capable of dispersing the wax emulsion illustratively include water (de-ionized) and short chain alcohols. Illustrative examples of short chain alcohols include isopropanol, ethanol, ethylene glycol, propylene glycol, diethylene glycol, diethylene glycol monoethyl ether, ethylene glycol monoethyl ether, and combinations thereof. Preferably, the organic solvent is VOC exempt. As used herein, "VOC" is defined as a compound listed on the United States Environmental Protection Agency Master List of Volatile Organic Compounds.

An inventive composition in some embodiments may also contain a propellant when aerosol delivery is desired. In other embodiments, inventive compositions are applied by consumers by a simple trigger spray or simply by sponging onto a target substrate. An inventive composition optionally includes an inert gas, a halocarbon, carbon dioxide, or hydrocarbon propellant in instances when an aerosol delivery system of an inventive composition is desired. Aerosol propellants operative herein illustratively include difluoroethane, trifluoroethane; alkanes such as butane, pentane, isobutane; propane; ethers such as dimethyl ether and diethyl ether; nitrogen; carbon dioxide; and combinations thereof. The resultant composition inclusive of a propellant is sealed within a conventional metal aerosol canister and applied by spray application as is conventional to the art.

An inventive composition includes a waterborne wax emulsion which is capable of forming a hydrophobic film on a plastic substrate, as measured by a water droplet contact angle of greater than 90 degrees and typically between 95 and 110 degrees. The sliding angle is less than 35 degrees. An inventive composition includes a waterborne wax emulsion that is a storage stable (thermodynamically stable) dispersion, with the dispersed phase having small droplets ranging in size from 10 to 100 microns. In certain inventive embodiments and for ease of formulation, wax compounds are selected that self-emulsify in water.

Self-emulsifying wax has the attribute of being able to simultaneously bind oil and water together to form an emulsion. Emulsifying waxes of the present invention in having both hydrophobic and hydrophilic regions enables the simultaneous binding of both water and hydrophobic substances. Without intending to be bound by a particular theory, it is believed that that plastic substrates and in particular plastic substrates are hydrophobic while the inventive formulation is water based and hydrophilic in character. As the formulation dries, the wax particulate adhere to the substrate and dry to a waxy film that is water repellent.

In certain embodiments of the invention, various additives are present in an inventive formulation to enhance a property illustratively including storage stability, film formation, film durability and cleaning properties. Additives are provided such as a dye to modify the color of an inventive composition, a biocide to inhibit microbial growth, a bitterant such as a denatonium, light stabilizers, defoamers, corrosion inhibitors, thickeners, a cleaning solvent, or combinations thereof. Each additive of a dye, biocide, bitterant, film plasticizers, light stabilizers, defoamers, corrosion inhibitors, and thickeners are independently and typically present in an inventive composition in an amount of from 0 to 5 total weight percent, while in other specific embodiments, each is present from 0.01 to 0.5 total weight percent. A cleaning solvent such as isopropyl-alcohol, if present, are present from 1 to 10 percent.

A biocide operative herein illustratively includes 2-methyl-4-isothiazolin-3-one, 5-chloro-2-methyl- 4-isothiazolin-3-one, 2-methyl- 4-isothiazolin-3-one, 1,2-benzisothiazolin-3-one, 1,2 benzisothiazolin-3-one, sodium hydroxymethylglycinate, and combinations thereof.

A defoaming agent is present in certain embodiment in an amount present to inhibit blister formation in a hydrophobic film so produced from an inventive composition. Defoamer agents operative herein illustratively include silicone-based defoamers; mineral oil-based defoamers, and mixtures of foam destroying polymers and hydrophobic solids such as polyureas, as are known to the art. Specific exemplary silicone-based defoamers illustratively include silica-filled polydimethyl siloxane and polyether-modified polysiloxanes.

A light stabilizer operative herein illustratively includes a liquid hindered amine, and benzotriazoles. It is appreciated that a light stabilizer also protects a plastic substrate from environmental light damage that can haze or otherwise degrade a transparent plastic substrate.

A corrosion inhibitor operative herein illustratively includes sodium benzoate, triethanolamine dinonylnaphthalene, boric acid-triethanolamine salt, phosphoric acid-triethanolamine salt, ammonia, triethanolamine, capryloamphoprionate, and mixtures thereof.

A thickener operative herein illustratively includes polyacrylic acid, acrylate xanthan gum, carbopols, cellulosic ethers, agarose, and combinations thereof.

An inventive composition is readily stored in glass, metal, or plastic containers made of plastics such as polyethylenes, polypropylenes, nylons, polyvinyl chloride, or polyethylene terphthalate, or aerosol cans.

Typical and preferred compositions according to the present inventions are provided in Table 1.

TABLE 1

Inventive Formulation (amounts in total weight
percent exclusive of optional propellant)

| Ingredient | Typical | Preferred |
|---|---|---|
| Wax emulsion | 2-20 | 3-10 |
| Plasticizer | 0-5 | 0-1 |
| Biocide | 0-1 | 0-0.5 |
| Cleaning solvent | 0-20 | 5-15 |
| Light stabilizer | 0-1 | 0-0.2 |
| Defoamer | 0-1 | 0.01-0.5 |
| Corrosion inhibitor | 0-2 | 0-1 |
| Solvent system | to 100% | to 100% |
| Water and carrier | | |

An inventive composition is readily provided as a kit in the form of a bottle or aerosol canister. The bottle optionally equipped with a pump- or spray-trigger. With the provision of an optional wipe remove excess composition, along with instructions for doing so, an inventive kit is operational. The instructions providing details as how to prepare a substrate, apply the inventive composition, removal of excess from the substrate and the time and properties of the film so applied. The instructions can also provide details as to how the composition is re-applied after an applied film is worn.

The present invention is further detailed with respect to the following non-limiting examples that are provided to further illustrate the preparation of specific inventive compositions and certain attributes associated with the resulting films on substrates.

EXAMPLE 1

Cleaner with Repellent Properties:

A composition for plastic substrate cleaner formulation with water repellancy properties contains 1 total weight percent of a wax emulsion (25% cationic modified paraffin wax and 15% surfactant and an oil content of 3%, with remainder being water). The wax having a melting temperature of 128° F. A specific inventive formulation is provided in Table 2.

TABLE 2

Specific inventive formulation with cleaning and repellency
(amounts in total weight percent exclusive of optional propellant)

| Ingredients | Weight |
|---|---|
| De-ionized water | 79.40 |
| Co-solvent (propylene glycol) | 10.00 |
| Cleaning solvent (Isopropyl alcohol)] | 5.00 |
| Waterborne cationic wax emulsion | 5.00 |
| Thickener (Polyacrylate-1 Crosspolymer) | 0.50 |
| Biocide (2-methyl-4-isothiazolin-3-one) | |
| Total | 100.00 |

In water based composition, isopropyl alcohol is used as cleaning solvent.

EXAMPLE 2

Water Repellent Properties:

An inventive formulation with water repellency properties is provided, where the same constituents are used relative to Example 1 and detailed in Table 3.

TABLE 3

Specific inventive formulation with repellency (amounts
in total weight percent exclusive of optional propellant)

| Ingredients | Weight |
|---|---|
| De-ionized water | 84.90 |
| Co-Solvent | 10.00 |
| Waterborne cationic wax emulsion | 5.00 |
| Biocide | 0.10 |
| Total | 100.00 |

EXAMPLE 3

A contact angle instrument (Krüss Mobile Drop) was used to measure contact angle of water on a clean-untreated plastic surface or a clean-treated like plastic surface. A higher contact angle value indicates better water droplet beading on the surface (hydrophobicity), and hence better repellency and better conditions for water removal from the surface under external force such as blowing wind or gravity.

An in-house built sliding angle instrument was used to measure the sliding angle of a water drop on a plastic surface. The angle at which the water droplet starts sliding down the plastic surface (due to gravity force) was recorded as the sliding angle. The lower the sliding angle value, the easier the water droplet rolls-off the plastic surface.

The formulation of Example 2 was dried on an acrylic substrate and polycarbonate substrate both dramatically improved water repellency (see data below).

| | Polycarbonate Plastic | | | |
|---|---|---|---|---|
| | Average Contact Angle (degrees) | | Average Slide Angle (degrees) | |
| Panel No. | Untreated | Treated | Untreated | Treated |
| 1 | 82.2 | 102.9 | 40.4 | 20.2 |
| 2 | 83.1 | 104.7 | 39.4 | 19.4 |
| 3 | 83.8 | 103.3 | 40.6 | 20.2 |
| 4 | 81.7 | 103.1 | 39.0 | 17.6 |
| Average | 82.7 | 103.5 | 39.0 | 19.4 |
| Delta | 20.8 | | −20.5 | |
| T-test | 0.000014 | | 0.000004 | |

| | Acrylic Plastic | | | |
|---|---|---|---|---|
| | Average Contact Angle (degrees) | | Average Slide Angle (degrees) | |
| Panel No. | Untreated | Treated | Untreated | Treated |
| 1 | 79.0 | 102.8 | 36.8 | 21.8 |
| 2 | 81.2 | 102.6 | 37.6 | 20.6 |
| 3 | 79.5 | 102.3 | 38.4 | 22.2 |
| 4 | 81.3 | 102.9 | 36.2 | 21.4 |
| Average | 80.3 | 102.6 | 37.3 | 21.5 |
| Delta | 22.4 | | −15.8 | |
| T-test | 0.00002 | | 0.00004 | |

EXAMPLE 4

The formulation of Example 1 is sealed in a conventional metal aerosol canister with gaseous nitrogen as a propellant.

The canister mixture is applied by spray application to the same substrates as used in Example3 with excess liquid being removed from the substrate surface. The resulting film coated substrates are tested and perform in a similar manner as to those in Example 1.

Patents and publications mention the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A film forming formulation comprising:
    an emulsion in water having an oil content of 1 to 20% by weight of said emulsion, 5 to 40% by weight of cationic wax of said emulsion, where said cationic wax is a molecule that has both a hydrophobic region and a hydrophilic region and said cationic wax has a melting temperature of between 43.3° C. and 60° C., and 5 to 25% by weight of cationic surfactant having an HLB value of between 4.0 and 12.0 in water;
    a carrier that is a majority by weight water in which said emulsion is dispersed as small droplets; and
    an organic carrier solvent miscible with water forming a clear solution or suspension.

2. The formulation of claim 1 wherein said wax is a paraffin wax.

3. The formulation of claim 1 wherein said carrier solvent is isopropanol, ethanol, ethylene glycol, propylene glycol, diethylene glycol, diethylene glycol monoethyl ether, ethylene glycol monoethyl ether, and combinations thereof.

4. The formulation of claim 1 wherein the carrier is present at between 80 and 98 total weight percent.

5. The formulation of claim 1 wherein said emulsion, and said organic carrier solvent are devoid of volatile organic compounds (VOCs).

6. The formulation of claim 1 further comprising at least one additive of a dye, a biocide, a defoamer, a light stabilizer, a corrosion inhibitor, a cleaning solvent or a thickener.

7. The formulation of claim 1 wherein said wax has a melting temperature of between 48.8° C. and 54.4° C.

8. A film forming formulation consisting essentially of:
    an emulsion in water having an oil content of 1 to 20% by weight of said emulsion, 15 to 40% by weight of cationic wax of said emulsion, where said cationic wax is a molecule that has both a hydrophobic region and a hydrophilic region and said cationic wax has a melting temperature of between 43.3° C. and 60° C., and 5 to 25% by weight of cationic surfactant having an HLB value of between 4.0 and 12.0 in water;
    a carrier that is a majority by weight water in which said emulsion is dispersed as small droplets; and
    an organic carrier solvent miscible with water forming a clear solution or suspension; and
    an optional additive of at least one of a dye, a plasticizer, a biocide, a defoamer, a light stabilizer, a corrosion inhibitor, or a thickener.

9. A process for forming a water repellent film on a plastic substrate comprising:
    applying the formulation of claim 1 to the plastic substrate; and removing excess of the formulation from the surface to form the water repellent film.

10. The process of claim 9 wherein applying is with a spray pump.

11. The process of claim 9 wherein applying is with a sponge or towel.

12. The process of claim 9 wherein applying is with a propellant contained with the formulation in an aerosol can.

* * * * *